March 5, 1963  O. R. WUCZKOWSKI  3,080,468
BILLET HEATER CONTROL AND METHOD
Filed March 7, 1960  2 Sheets-Sheet 1
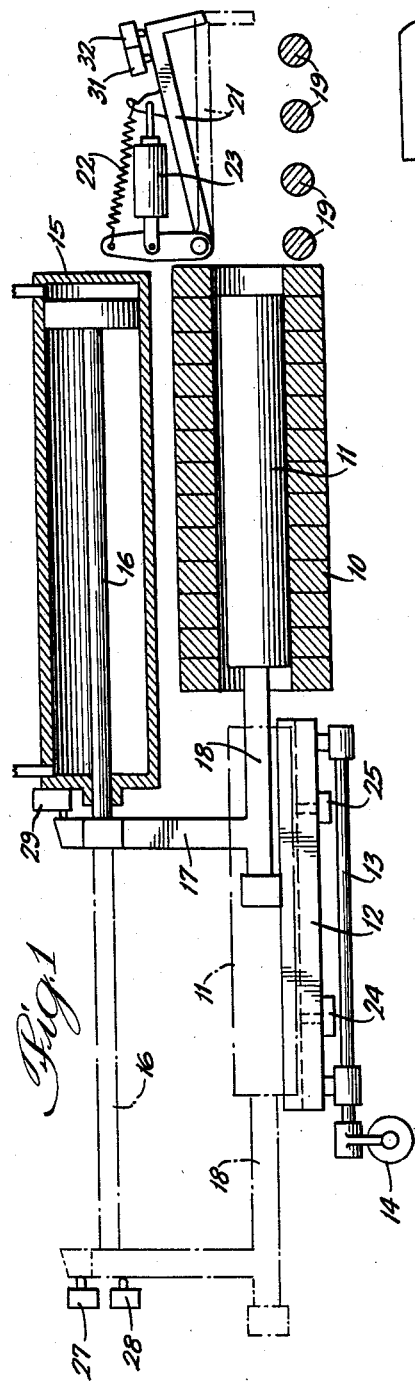
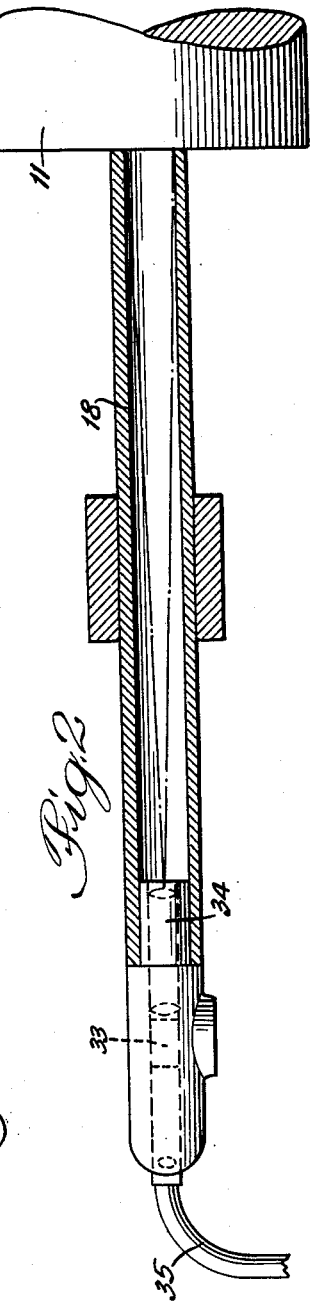
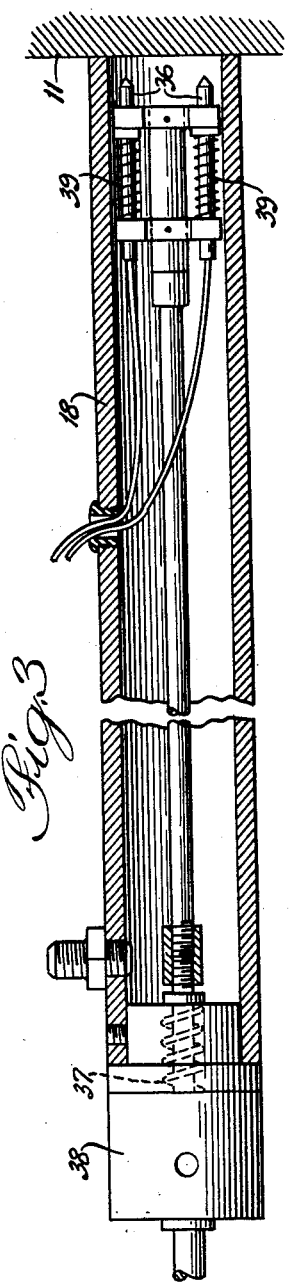
INVENTOR:
Othmar R. Wuczkowski,
BY Blair, Freeman & Molinare
ATTORNEYS.

March 5, 1963 — O. R. WUCZKOWSKI — 3,080,468
BILLET HEATER CONTROL AND METHOD
Filed March 7, 1960 — 2 Sheets-Sheet 2

INVENTOR:
Othmar R. Wuczkowski,
BY Bair, Freeman & Molinare
ATTORNEYS.

United States Patent Office 3,080,468
Patented Mar. 5, 1963

3,080,468
BILLET HEATER CONTROL AND METHOD
Othmar R. Wuczkowski, Chicago, Ill., assignor to Lindberg Engineering Company, Chicago, Ill., a corporation of Illinois
Filed Mar. 7, 1960, Ser. No. 13,267
4 Claims. (Cl. 219—10.77)

This invention relates to a billet heater control and method and more particularly to the control of low frequency induction heating of billets, and the like.

The heating of billets by low frequency induction currents, generally on the order of 60 cycles, has been widely used in recent years. One of the major problems encountered in devices for this purpose is control of the heating so that the billets are heated accurately to the desired temperature in the induction coil. Thermocouples moved into contact with the billets have been used for this purpose, but are not entirely satisfactory due to the difficulty of making good contact with the billet as it is heated because of the presence of scale, dirt and the like. Similarly, radiant sensing devices, such as photoelectric cells, have not been too satisfactory for the same reasons.

Another control system proposed is one in which the power input to the induction coil is measured and the heating is terminated after supply of a predetermined amount of power. This system of control is quite accurate except for the fact that the initial temperatures of the billets may vary considerably leading to corresponding variations in the final temperature.

The principal object of the present invention is to provide for the compensation of differences in initial temperatures of the billets so that accurate final temperature control can be achieved by supplying of predetermined amount of power to the induction heating coil for the billets.

Another object is to provide a billet heater control and method in which the billet is preheated in the induction coil to a predetermined relatively low temperature and thereafter a predetermined amount of power is supplied to the induction coil to raise the billet to the desired high temperature. It has been found that the relatively low preheating temperature can be measured through conventional measuring devices with a far less margin of error than the high final temperature so that the overall effect is to achieve a high degree of accuracy in control of the final temperature.

The above and other objects and features of the invention will be more readily apparent from the following description when read in connection with the accompanying drawings, in which:

FIGURE 1 is a diagrammatic elevation with parts in section of a billet heating apparatus equipped with a control embodying the invention;

FIGURE 2 is an enlarged partial section through the billet pusher rod;

FIGURE 3 is a view similar to FIGURE 2 showing an alternative construction;

Figure 4:
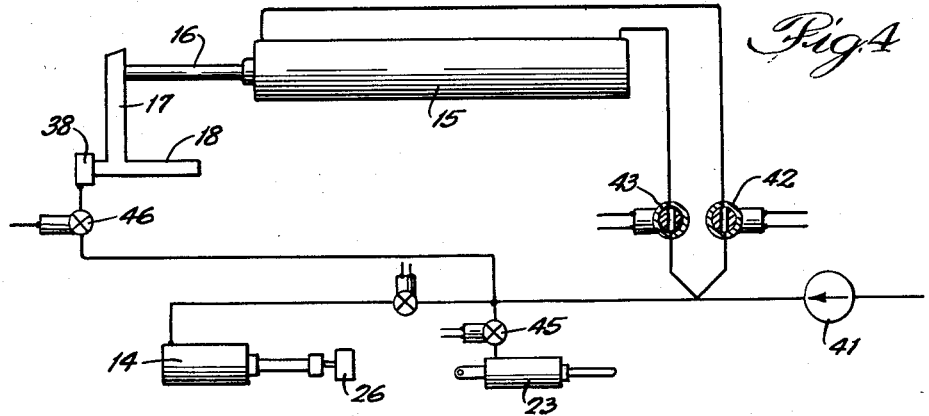
FIGURE 4 is a circuit diagram for the fluid power system.

Referring first to FIGURE 1, a billet heating machine equipped with a control system embodying the present invention may comprise a conventional induction coil 10 which is tubular in shape so that billets, as indicated at 11, may be pushed into the coil for heating and may then be pushed through the coil. Billets to be pushed into the coil are held in alignment therewith by a tiltable V-shaped trough 12 which is mounted on a pivot rod 13 for pivoting about an axis parallel to the coil axis either into alignment with the coil or to a tilted position out of alignment with the coil in which a billet is received therein from a rack, or the like. The trough 12 is tilted by a fluid motor 14, such as an air cylinder. Normally the trough is held in a position in alignment with the coil by a spring, or the like and is tilted out of such position into position to receive a billet from the rack when air is supplied to the rear end of the cylinder 14.

A billet on the trough 12 is pushed into the coil by a double acting fluid motor 15 which is shown as mounted above the coil 10 and which has an elongated piston rod 16. The piston rod 16 at its outer end carries a cross frame member 17 which supports a tubular pusher rod 18 at its lower end. When the piston rod is moved out to the dot-dash line position shown in FIGURE 1, a billet may be supported on the trough 12 in alignment with the coil 10 and when the piston rod is moved inward of the cylinder to the full line position shown, the pusher rod 18 will engage the end of the billet and push it into a substantially centered position in the coil, as shown. At the same time a previously heated billet in the coil will be pushed out onto a conveyor, indicated as a roller type conveyor 19, which may be power driven to move the billet away from the coil.

In the usual billet heater, the billet after being heated is moved to a position remote from the coil and is held in such position by a movable stop until the forging machine, or the like, in which the billet is to be processed is ready to receive it. In FIGURE 1, a movable stop in the form of an angular arm 21 is shown pivoted at one end with its other end movable into the path of a billet on the conveyor 19. While the stop has been illustrated adjacent to the coil, it will be understood that actually the stop is remote from the coil so that the heated billet completely leaves the coil before engaging the stop. The stop is urged upward to its full line position shown by a spring 22 and may be swung downward to its effective position by a fluid motor 23.

Operation of the several parts of the heater, and particularly the billet feeding, advancing and stopping parts, is controlled in an automatic cycle by a series of electric switches. As shown in FIGURE 1, a switch 24 is mounted on the V-shaped trough 12 to be engaged by a billet in the trough 12 and closed when a billet is present. A similar switch 25 is mounted on the V-shaped trough to be engaged by the billet and open when a billet is in the trough. The fluid motor 14, as shown in FIGURE 4, engages and closes a switch 26 when the fluid motor is extended, as illustrated, which is the position it occupies when the V-shaped trough 12 is aligned with the coil 10. A switch 27 is engaged by the cross frame 17 when the piston rod 16 is extended from the fluid motor 15 to be closed thereby and a similar switch 28 is simultaneously engaged by the cross frame 17 to be opened when the cross frame is remote from the motor cylinder. When the piston rod 16 is moved into the cylinder, the cross frame 17 will engage and close a switch 29 which is illustrated as mounted on the cylinder. A normally closed switch 31 is engaged and opened by the stop lever 21 when it is in its elevated position shown and a similar normally closed switch 32 is engaged and opened by the stop lever 21 when it is in its elevated position.

According to the present invention, means are provided for sensing the initial relatively low temperature on a billet in the heating coil so that the major heating of each billet will start with each of the billets at the same starting temperature. This sensing means, as shown in FIGURES 2 and 3, is preferably mounted in the pusher rod 18 to sense the temperature of the adjacent end of the billet after the billet has been pushed into the coil. As shown in FIGURE 2, the pusher rod 18 contains a radiant energy sensitive unit, such as a photoelectric cell 33 mounted at its outer end and a lens system, indicated generally at 34, for focusing radiant energy from the adjacent end of the billet 11 onto the cell. The cell is electrically connected through wires 35 into the electrical control circuit, as described more particularly hereinafter, to initiate operation of the power measuring means after the billet has reached a predetermined relatively low temperature. This temperature may be on the order of room temperature but is preferably about 200° F., which can be sensed relatively accurately despite the possible presence of a certain amount of dirt or scale on the end of the billet so that each billet will start its major heating cycle within a relatively few degrees of the same temperature.

In the alternative construction, as shown in FIGURE 3, thermocouple elements 36 are movably mounted in the pusher rod 18 adjacent to its forward end physically to contact the adjacent end of a billet to sense the temperature thereof. It is undesirable to maintain the thermocouples in contact with the billet during the entire operation and for this purpose the thermocouples are normally urged rearwardly out of contact with the billet by a spring 37 and may be moved forwardly into engagement with the billet by a fluid motor 38. The thermocouples 36 may also be resiliently mounted and supported by springs 39 so that they will always engage the billets with the same pressure and can accommodate irregularities in the billets without being damaged. FIGURE 4 illustrates a fluid circuit for supplying fluid operating power to the several fluid motors, the supply of power being in each case controlled by electrically operated valves. As shown, fluid under pressure for operating the several cylinders may be supplied from a source 41, such as an air compressor. The outlet side of the compressor is connected through valves 42 and 43 to the opposite ends of the fluid motor 15 so that when one valve is open and the other is closed the piston rod 16 will be moved either to its extended or retracted position. Supply of fluid to the fluid motor 14 for tilting the trough 12 is controlled by a solenoid valve 44 and supply of fluid to the fluid motor 23 for lowering the stop arm 21 is controlled by a solenoid valve 45. In case the construction of FIGURE 3 is employed, operating fluid for the fluid motor 38 is supplied through a solenoid operated valve 46. While the valves have been illustrated diagrammatically, it will be understood that three-way valves are preferably employed which in the closed position vent the respective connections to the fluid motors and which in the open position connect the respective connections to the fluid motors to the source 41.

Figure 5:
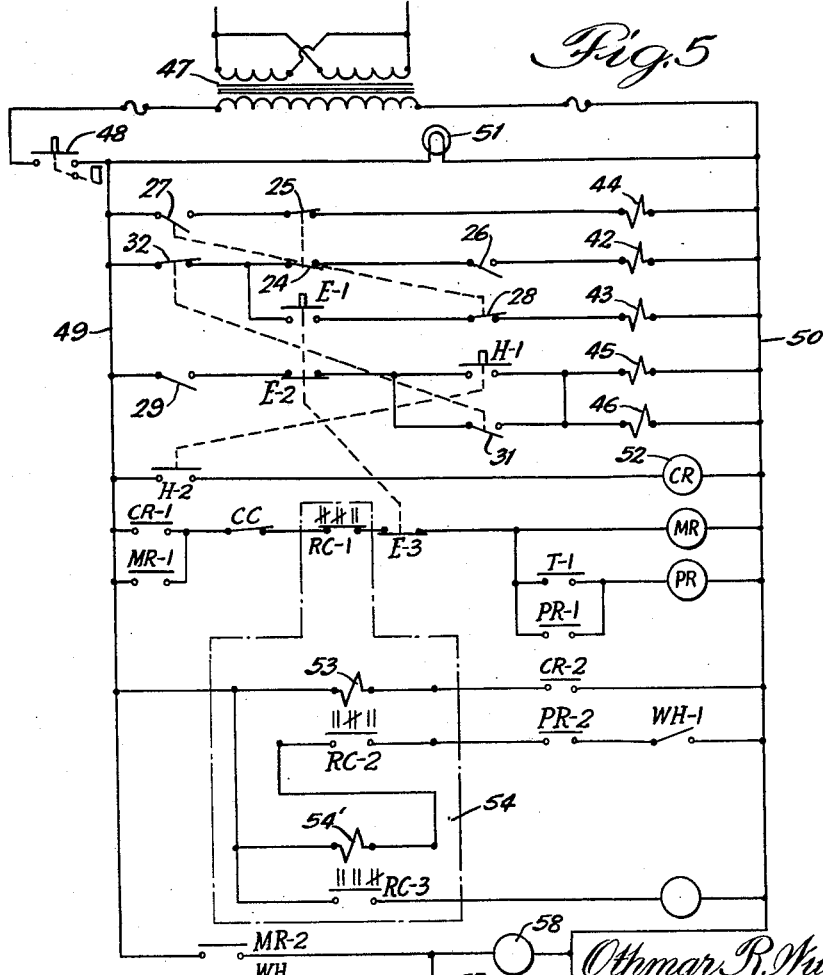
FIGURE 5 is an electrical circuit diagram of the control system.

Operation of the several valves and control of the supply of heating current to the heating coil 10 is all controlled by an automatic control system, as illustrated diagrammatically in FIGURE 5. This system, as shown, is an electrical system receiving operating power from a transformer 47 and effecting complete operation and control of the several operating parts in an automatic cycle. The circuit is initially turned on by a manually operable switch 48 which connects the lines 49 and 50 across the secondary of the transformer, these lines serving as the power supply sources for the several valves and other parts to be described. When the switch 48 is closed a pilot light 51 will be lighted to indicate to the operator that the system is in operating condition.

In addition to the several switches 24 to 32, which were described above and which are connected in circuit with the several valves 42 to 46, as shown in FIGURE 5, the control circuit comprises a double contact heat control switch H–1 having one contact H–1 in circuit with the valve 45 and its other contact H–2 in circuit with a control relay 52. The control relay operates when energized to close normally open contacts CR–1 and CR–2. There is also provided a triple contact eject switch having one set of contacts E–1 in circuit with the valve 43 and normally open, a second set of normally closed contacts E–2 in circuit with the valve 45, and a third set of normally closed contacts E–3 in circuit with a relay MR which when energized closes normally open switch contacts MR–1. The relay MR is energized through the contacts E–3, a first counter switch RC–1, the contacts CR–1 and MR–1 in parallel, and an excess temperature switch CC which is normally closed and which is open only when the temperature of the billet as sensed by a separate sensing device, not shown, exceeds a predetermined value. The same contacts plus an additional contact T–1, which is closed when the billet reaches a predetermined temperature as sensed either by the photocell 33 or the thermocouples 36, control the circuit to a pyrometer relay PR. When the pyrometer relay is energized, it closes normally open switches PR–1 and PR–2, the former of which closes a holding circuit parallel to the switch T–1 to keep the relay PR energized. The switch CR–2 is connected in series with a clutch operating coil 53 of a reset counter, indicated within the dot-dash lines 54, and which includes the contacts RC–1, a second set of contacts RC–2 and a third set of contacts RC–3. The contacts RC–1, RC–2 and RC–3 of the reset counter are moved simultaneously to three different positions in the first of which, as indicated by the symbols above the contacts, the contacts RC–1 are closed and contacts RC–2 and RC–3 are open. In the second position, contacts RC–1 and RC–2 are closed and contacts RC–3 are open. In the third position, contacts RC–1 and RC–2 are open and contacts RC–3 are closed. Contacts RC–2 are connected in a circuit with a counter coil 54' and with the pyrometer contacts PR–2 and an impulse counting switch WH–1. When the contacts RC–2 and PR–2 are closed, the counter coil will be energized each time the impulse switch WH–1 is closed and after a predetermined number of counts the counter will operate to discontinue the supply of heating current to the coil 10, as described more fully hereinafter.

As shown in FIGURE 5, the coil 10 is supplied from a suitable current source 55 through a double contact switch 56 which is controlled by a main contactor relay 57. The relay 57 is connected in parallel with an indicator 58 and both are controlled by contacts MR–2 which are normally open and which are closed when the relay MR is energized.

The amount of power supplied to the coil 10 is measured by a watt hour meter WH connected in circuit with the coil and which is constructed to close the impulse switch WH–1 at predetermined intervals after the passage of a predetermined amount of power. In this way, the watt hour meter and impulse switch WH–1 measure the amount of power supplied to the inductance coil and the counter counts or integrates the amount of power supplied after the switch RC–2 is closed so that a predetermined desired amount of power may be supplied to the coil for billet heating purposes.

In an operating cycle, assuming that the trough 12 is tilted to its position to receive a billet, the switches 25 and 27 will be closed to energize the valve 44 to supply operating fluid to the motor 14 to tilt the trough 12. The parts will remain in this condition until a billet enters the trough at which time the switch 24 will be closed and the switch 25 will be opened. Opening of the switch 25 will de-energize the valve 44 allowing the trough 12 to move back to a position of alignment with the coil 10. When the trough 12 moves back into alignment with the inductor coil, the switch 26 will be closed and a circuit will be completed through switches 32, 24 and 26 to energize the valve 42. When the valve 42 is energized and is thereby opened, it will admit fluid to the outer end of the fluid motor 15 to retract the piston rod 16. This will move the pusher rod 18 into engagement with the end of a billet in the trough and move the billet into centered position in the coil, as shown in FIGURE 1, pushing out a billet previously in the coil and which had been heated.

Movement of the piston rod 16 into the cylinder 15 will close the switch 29 toward the end of the movement and will open the switch 27 and close the switch 28.

Opening of the swtich 27 will prevent re-energization of the valve 44 when the switch 25 is closed and closing of the switch 28 will prepare the circuit for energization of the valve 43.

The system is now in condition for application of heat to the billet in the induction coil, but will remain in this condition until the heat control switches H–1 and H–2 are operated. When the operator is ready to apply heat, he temporarily closes the heat control switches H–1 and H–2. Closing of the switch H–1 energizes the valve 45 through the switch H–1 and switches E–2 and 29 to move the blocking lever 21 downward in a position to engage and block a heated billet as it moves out of the coil. When the lever 21 moves downward, the switch 31 will close to energize the valve 46 when the thermocouple mechanism, as shown in FIGURE 3, is employed to move the thermocouples against the end of the billet. When the thermocouple mechanism is not used and the radiant energy mechanism of FIGURE 2 is used, the valve 46 may be omitted.

Closing of the contact H–2 energizes the relay CR which in turn closes the contacts CR–1 and CR–2. Closing of the contact CR–2 will energize the clutch 53 and will reset the counter switches to position 1 from position 3 in which they had previously been left. In this position, the switch RC–1 is closed and the switches RC–2 and RC–3 are open. Closing of the contacts CR–1 will energize the relay MR which will be maintained energized through the holding contacts MR–1 and at the same time closes the contacts MR–2 to operate the contactor 57 to supply current to the coil 10.

When the heat button is released, the contacts H–1 and H–2 will reopen to de-energize the relay CR and reopen the contacts CR–1 and CR–2. Opening of the contacts CR–2 de-energizes the clutch 53 which causes the counter contacts to move to their second position in which contacts RC–1 and RC–2 are closed and contact RC–3 is opened. The valves 45 and 46 will, however, remain energized through the switches 29, E–3 and 31 so that the safety lever will remain down and the thermocouples when employed will remain in contact with the billet.

The circuit remains in this condition until the billet has been brought up to the desired initial temperature at which time the billet temperature sensing device, either the photoelectric cell 33 or the thermocouples 36, sense the desired starting temperature and close the contact T–1 to energize the relay PR. When the relay PR is energized, it closes the contacts PR–2. With contacts PR–2 and RC–2 both closed, the counter coil 54 will be energized each time the watt hour meter impulsing switch WH–1 closes to advance the counter one step. The counter will therefore count the impulses and will measure the power supplied to the induction coil 10.

After a predetermined interval determined by the setting of the counter, it will count out and will move the counter switches to the third position in which contacts RC–1 and RC–2 are open and contacts RC–3 are closed. Opening of contacts RC–1 will de-energize the relay MR to open the contacts MR–2 and de-energize the contactor 57 so that the switches 56 will open to interrupt supply of heating current to the coil 10. At the same time, the relay PR wlil be de-energized to open the contacts PR–1 and PR–2 to interrupt the circuit through the counter coil 54. At this time, the billet has been heated to the desired final temperature and the parts will remain in their existing position until the operator is ready to release the billet held by the stop lever 21 and to force a new billet into the heater coil thereby ejecting the previously heated billet therefrom.

To accomplish this, the operator presses the eject button, temporarily closing the contacts E–1 and opening the contacts E–2 and E–3. Opening of the contacts E–3 does not change the circuit condition in the event the counter has counted out before the eject button is pressed. However, the eject button may be pressed at any time to discontinue the heating operation in which case opening of the contact E–3 will insure that the relays MR and PR are deenergized so that supply of heating current to the coil will be interrupted as described above.

Closing of the contacts E–1 will energize the valve 43 through the contacts E–1 and the switch 28 which is then closed to supply operating fluid to the closed end of the fluid motor 15 to move the piston rod 36 to its extended position shown in dot-dash lines in FIGURE 1. This retracts the pusher rod 18 to a position where a new billet can be placed on the trough 12 without interfering with the pusher rod for a subsequent reloading operation.

Opening of the contacts E–2 interrupts the circuit to the valves 45 and 46, thereby closing valve 45 and allowing the spring 22 to elevate the stop lever 21 so that a billet on the conveyor 19 can move onward to the desired point of further treatment. De-energizing of the valve 46 interrupts the supply of operating fluid to the fluid motor 38 so that the spring 37 can retract the thermocouples 36 from engagement with the billet in the case thermocouples, as shown in FIGURE 3, are employed.

When the piston rod 36 has moved completely out from its cylinder to the dot-dash line position of FIGURE 1, the switch 27 will again be closed to energize the valve 44 through the closed switch 25 so that the trough 12 will be tilted to receive a new billet. At the same time, the switch 28 will be opened to interrupt the circuit through the valve 43 so that it will not be maintained energized even though the eject button should be held down to close the contacts E–1. The system is now in the condition originally described, ready for a succeeding operating cycle, the cycling as above described continuing as long as billets are supplied to the trough 12 and as long as the operator continues to operate the heat and eject switches at desired intervals.

While one embodiment of the invention has been shown and described herein, it will be understood that it is illustrative only and not to be taken as a definition of the scope of the invention, reference being had for this purpose to the appended claims.

What is claimed is:

1. A control system for a billet heater having an open ended induction coil to receive and heat a billet, a feeder adjacent to one end of the coil movable to one position to receive a billet to be heated and to a second position to align the billet thereon with the coil, first power means to move the feeder, and power operated means to move a billet carried by the feeder in its second position into the coil, the control system comprising a circuit to supply current to the coil, a power meter in the circuit, timing means operated by the power meter to interrupt the circuit after a predetermined flow of power therethrough, sensing means to sense the temperature of a billet in the coil, control devices operated by movement of the first power means and the power operated means for moving the feeder first to said one position and then to its second position and then for energizing the power operated means to move a billet on the feeder into the coil, a manually operable control to close said circuit and to condition the sensing means for operation, and control means operated by the sensing means to initiate operation of the timing means after the billet reaches a predetermined temperature.

2. The system of claim 1 in which the sensing means is a thermocouple movably carried by the power operated means and the manually operable control operates means on the power operated means to move the thermocouple into engagement with a billet in the coil.

3. A heat control system for a billet heater having an open ended induction coil to receive and heat a billet, a feeder adjacent to one end of the coil movable to one position to receive a billet to be heated and to a second position to align the billet thereon with the coil, power means to move the feeder, power operated means to move a billet carried by the feeder in its second position into the coil, a conveyor to receive a billet discharged from the other end of the coil, a movable stop adjacent to the conveyor to hold a billet thereon spaced from the coil, and second power means to move the stop, the control system comprising a circuit to supply current to the coil, a power meter in the circuit, timing means operated by the power meter to interrupt the circuit after a predetermined operation, sensing means to sense the temperature of a billet in the coil, manually operated heat and eject controls, and controls operated by the power means, the power operated means and the sensing means and in circuit with the manual and heat controls and operable in an automatic cycle when the eject control is operated to retract the power operated means, operate the second power means to move the stop away from a billet on the conveyor, and operate the first named power means to move the feeder to said one position, movement of a billet into the feeder operating controls to return the feeder to its second position and to operate the power operated means to move the billet on the feeder into the coil, the controls operating in an automatic cycle when the heat control is operated to energizing the coil and for conditioning the sensing means for operation, and a control operated by the sensing means to initiate operation of the timing means when the billet reaches a predetermined temperature.

4. A control system for a billet heater having an open ended induction coil to receive and heat a billet, a feeder adjacent to one end of the coil to receive a billet to be heated and to align the billet thereon with the coil, and power operated means to move a billet carried by the feeder into the coil, the control system comprising a circuit to supply current to the coil, a power meter in the circuit, timing means operated by the power meter to interrupt the circuit after a predetermined flow of power therethrough, sensing means to sense the temperature of a billet in the coil, a manually operable control to close said circuit and to condition the sensing means for operation, and control means operated by the sensing means to initiate operation of the timing means after the billet reaches a predetermined temperature.

References Cited in the file of this patent
UNITED STATES PATENTS

| | | |
|---|---|---|
| 1,367,124 | Colby | Feb. 1, 1921 |
| 1,981,631 | Northrup | Nov. 20, 1934 |
| 2,381,310 | Richter | Aug. 7, 1945 |
| 2,510,770 | Bohn | June 6, 1950 |
| 2,971,754 | Seyfried | Feb. 14, 1961 |